(12) United States Patent  
Kerstan et al.

(10) Patent No.: US 9,216,766 B2  
(45) Date of Patent: Dec. 22, 2015

(54) WHEEL OF A VEHICLE

(71) Applicant: Bayerische Motoren Werke Aktiengesellschaft, Munich (DE)

(72) Inventors: Herwig Kerstan, Maisach-Gernlinden (DE); Ingo Kuwalefsky, Markt Schwaben (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/444,592

(22) Filed: Jul. 28, 2014

(65) Prior Publication Data

US 2015/0102592 A1    Apr. 16, 2015

(30) Foreign Application Priority Data

Jul. 29, 2013   (DE) .......................... 10 2013 214 719

(51) Int. Cl.
| | |
|---|---|
| *B62D 21/15* | (2006.01) |
| *B60B 35/00* | (2006.01) |
| *B60G 7/00* | (2006.01) |
| *B62D 9/00* | (2006.01) |

(52) U.S. Cl.
CPC .............. *B62D 21/152* (2013.01); *B60B 35/00* (2013.01); *B60G 7/001* (2013.01); *B62D 9/00* (2013.01); *B62D 21/157* (2013.01); *B60G 2206/016* (2013.01); *B60G 2206/50* (2013.01)

(58) Field of Classification Search
CPC ............. B60R 19/34; B60G 2206/016; B60G 2206/50; B62D 21/152

USPC ........... 280/913.512, 784; 293/118, 119, 132, 293/150; 296/187.09

See application file for complete search history.

(56) References Cited

U.S. PATENT DOCUMENTS

| | | | |
|---|---|---|---|
| 3,801,124 A * | 4/1974 | Afanador et al. ........ 280/93.512 |
| 3,940,159 A * | 2/1976 | Pringle ........................... 280/88 |
| 5,199,730 A * | 4/1993 | Westfall et al. .......... 280/93.512 |
| 8,490,986 B1* | 7/2013 | Ostrander et al. ....... 280/93.512 |
| 2004/0150181 A1* | 8/2004 | Gottschalk ............... 280/93.512 |
| 2008/0283314 A1* | 11/2008 | Suzuki ................... B60G 7/008 180/65.51 |
| 2009/0066049 A1* | 3/2009 | Kunert ................... B60G 3/265 280/124.134 |
| 2011/0083923 A1* | 4/2011 | Ajisaka ......................... 180/291 |
| 2014/0027994 A1* | 1/2014 | Varela et al. ............. 280/93.512 |
| 2014/0042722 A1* | 2/2014 | Lam .......................... 280/93.512 |
| 2014/0252742 A1* | 9/2014 | Lam ........................ B60G 7/02 280/124.134 |
| 2015/0102592 A1* | 4/2015 | Kerstan ................... B60B 35/00 280/784 |

FOREIGN PATENT DOCUMENTS

| | | |
|---|---|---|
| DE | 10 2011 086 890 A1 | 5/2013 |
| DE | 10 2012 019 797 A1 | 1/2014 |

OTHER PUBLICATIONS

German Search Report dated Mar. 28, 2014 with partial English translation (10 pages).

\* cited by examiner

*Primary Examiner* — Karen Beck  
(74) *Attorney, Agent, or Firm* — Crowell & Moring LLP

(57) ABSTRACT

A wheel carrier of a vehicle is provided with at least one spur to selectively deflect a wheel mounted on the wheel carrier in a predefined deflection direction in the event of an accident-generated application of force on the wheel.

19 Claims, 2 Drawing Sheets

WHEEL OF A VEHICLE

FIELD OF THE INVENTION

The invention relates to a wheel carrier of a vehicle. The invention furthermore relates to a vehicle comprising this type of wheel carrier, and to use of a spur on this type of wheel carrier.

BACKGROUND AND SUMMARY OF THE INVENTION

When a vehicle, in particular an automobile, crashes into an obstacle with minimal superposition, the kinematics of the associated front wheels becomes problematic. The kinematics constitutes a fundamental source of variances in terms of deformations to the vehicle and in terms of the desired objective of dissipating energy. The deformations are thus very difficult to predict with certainty, and this factor makes designing the overall system of the front body of a vehicle and its functionality during a front impact extremely difficult.

As a result, the set objectives of improving crash protection for a front impact are difficult to achieve. The wheel behavior of known vehicles thus continues to be relatively unstable specifically in the event of a small-overlap-crash, that is, a crash where there is a small overlap or superposition of the struck object with the vehicle as viewed in the main direction of travel. At the same time there is the risk that unforeseen deformations will occur on the front wheel in reality or reality-approximating tests.

For this reason there is a general tendency to excessively oversize the design of the structure of the body at the front wheels. This results in increased weight and higher costs.

The object of the invention is to solve these problems by creating a wheel carrier for a vehicle, wherein at least one spur is provided on the wheel carrier so as to selectively deflect a wheel mounted on the wheel carrier in a predefined deflection direction in the event of an accident-generated application of force on the wheel.

In the event of a small-overlap-crash, the spur according to the invention allows the associated wheel and, in particular, the wheel rim, to be reliably deflected out of a previously uncertain bifurcation situation into a predefined direction and position. As a result, the wheel is branched into a functionally optimal kinematic situation that then enables a clear, predictable, and also appropriate deformation to occur on the vehicle.

In overall terms, the invention thus yields much more stable boundary conditions for designing the function of components in the wheel region in response to a front impact. It furthermore allows solutions to be found much more efficiently in terms of achieving the set objectives for this type of front impact. This results in lower expenditures for developing and designing wheel assemblies on vehicles, and also yields a savings in weight and cost for the wheel assemblies produced thereby.

In order to achieve this predefined wheel deflection, the at least one spur according to the invention is preferably directed inward proceeding from the wheel carrier relative to the vehicle and the vehicle's main direction of travel. This orientation of the spur enables the associated wheel to be deflected inward at the front and outward at the back in the event of a front impact. The wheel is thus selectively positioned obliquely relative to the main direction of travel such that it points inward at the front. A wheel that has been positioned obliquely in this way has an advantageous effect on the subsequent deformation of the vehicle body.

The at least one spur on the wheel carrier according to the invention is furthermore designed so as to include a deflection face that is oriented proceeding from the wheel carrier obliquely relative to the vehicle and its main direction of travel, thereby improving by means of the spur according to the invention the selective deflection of an associated wheel together with its rim and tire. The deflection face is advantageously aligned, in particular, essentially parallel to a vertical axis of the vehicle. A deflection surface aligned in this way causes the wheel and, in particular, its rim, to be deflected only laterally, not upward or downward, and this aspect further improves the effectiveness of the selective wheel deflection according to the invention in the event of a front impact.

A spur, here identified as the first spur, is furthermore advantageously provided on the wheel carrier according to the invention, which spur is disposed relative to a vertical axis of the vehicle above a wheel bearing supporting the wheel on the wheel carrier. This type of spur, in particular, supports a deflection by the wheel in response to the application of a force on this wheel coming obliquely from above. An application of force of this type on the wheel located directly above the roadway and coming obliquely from above is encountered especially often in a front impact. Alternatively or additionally, a second spur is advantageously provided on the wheel carrier according to the invention, which second spur relative to a vertical axis of the vehicle is disposed below a wheel bearing supporting the wheel on the wheel carrier. This second spur supports deflection also in response to an application of force coming obliquely from below.

The invention accordingly also specifically relates to a vehicle comprising this type of wheel carrier according to the invention, and to the use of a spur for the selective deflection of a wheel mounted on a wheel carrier, which deflection occurs in a predefined deflection direction in the event of an accident-generated application of force to the wheel.

BRIEF DESCRIPTION OF THE DRAWINGS

The following describes an exemplary embodiment of the inventive solution in more detail based on the attached schematic drawings. Here.

DETAILED DESCRIPTION OF THE DRAWINGS

Figure 1:
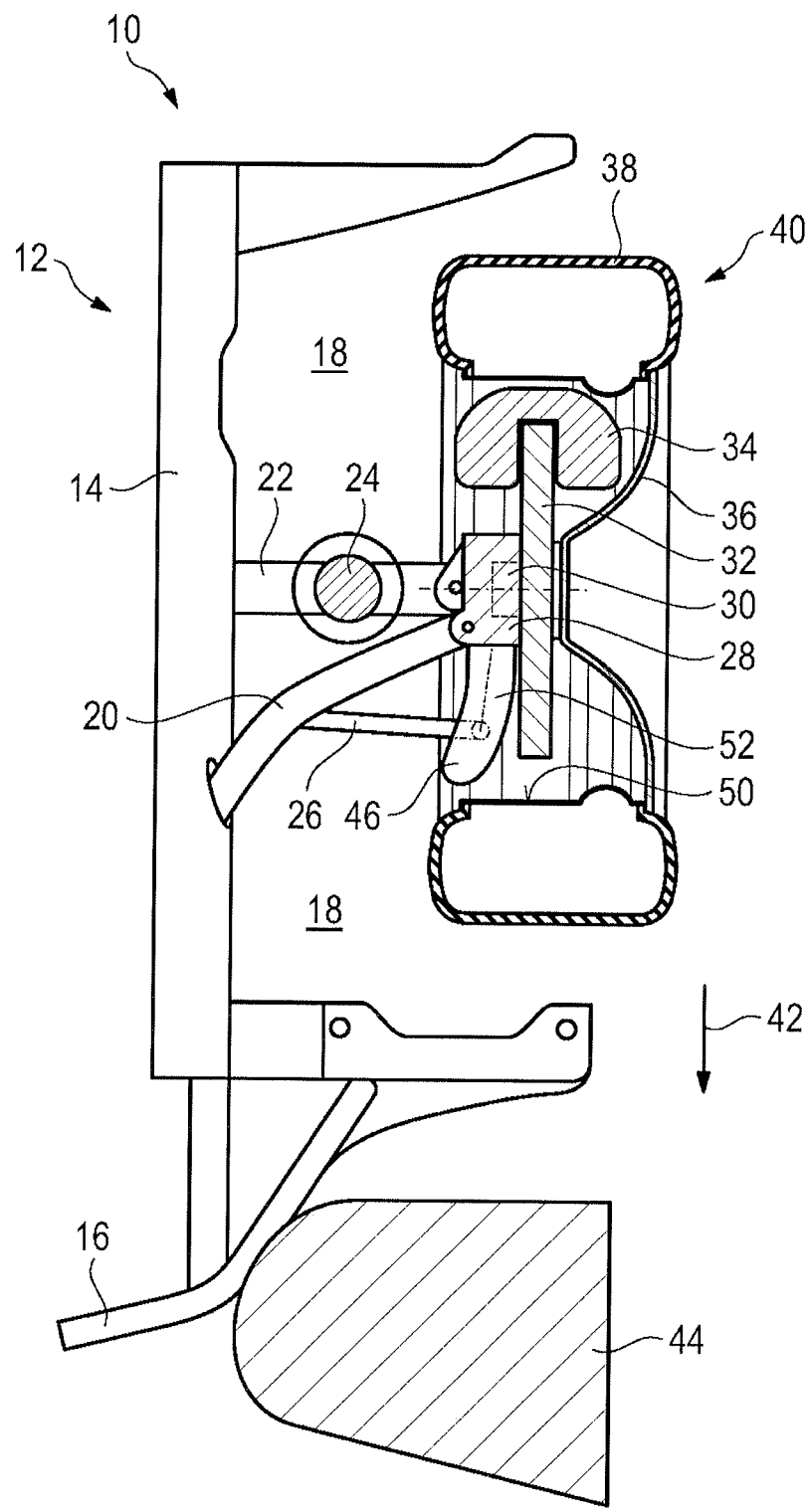
FIG. 1 is a cutaway top view from the front left of an embodiment of a vehicle according to the invention together with its wheel carrier.

FIG. 1 depicts part of a vehicle 10 including its body 10. Body 12 is provided with a frame side member 14 on which a projection 16 is located. A wheel housing 18 is formed in part by projection 16, in which wheel housing 18 are located a trailing arm 20, a control arm 22, a shock absorber 24, a steering arm 26, and a wheel carrier 28 of a wheel suspension.

A wheel bearing 30 is disposed in wheel carrier 28, by which bearing a brake disk 32 is rotatably supported. A brake caliper 34, which is also mounted on wheel carrier 28, can engage brake disk 30 to effect braking. Brake disk 32 in turn supports a rim 36 on which a tire 38 is located. Tire 38 together with rim 36 thus creates a wheel 40 that is rotatably supported on wheel carrier 28.

Figure 2:
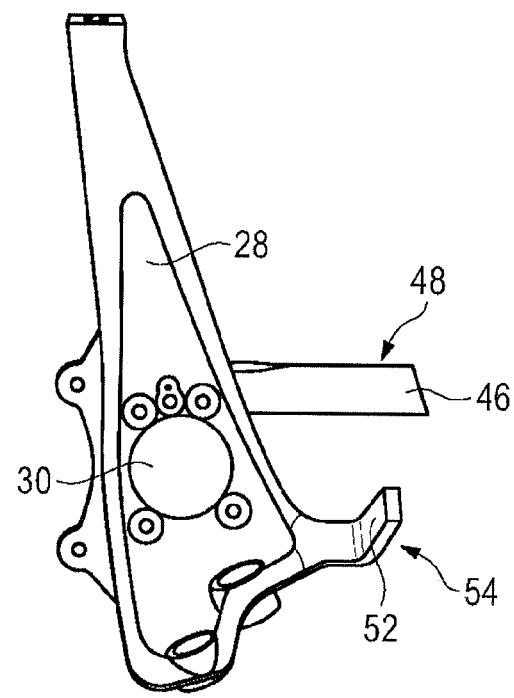
FIG. 2 is a perspective view of the wheel carrier in FIG. 1 from the inside.
Figure 3:
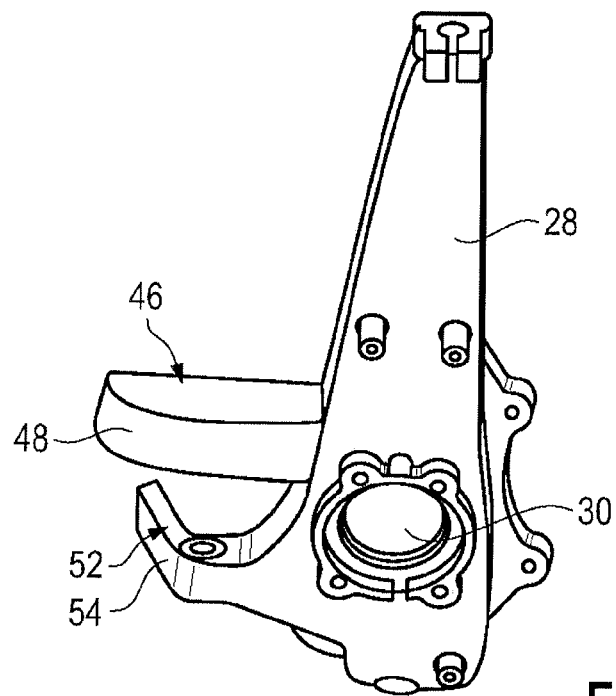
FIG. 3 is a perspective view of the wheel carrier in FIG. 1 from the outside.

Wheel 40 including its wheel carrier 28, which is depicted again in greater detail in FIGS. 2 and 3, is adapted so that it is specifically pivoted or deflected, specifically within wheel housing 18 in response to a front impact, and thereby moved into a functionally advantageous kinematic state. The front impact is simulated in FIG. 1 whereby an object 44 is moved with overlap only in the region of wheel housing 18 relative to vehicle 10 in a direction opposite to main direction of travel 42 for vehicle 10.

In order to enable wheel 40 to pivot, a first spur 46 is first immovably attached to wheel carrier 28 somewhat above wheel bearing 30, and oriented obliquely at the front and inward. Spur 46 thus projects obliquely inward into wheel housing 18, and also includes a deflection face 48 that is oriented obliquely and aligned parallel to a vertical axis of the vehicle. The inside 50 of rim 36 then moves onto this deflection face 48 during a predetermined front impact, with the result that rim 36, and along with it wheel 40, is pivoted inward at the front and outward at the back relative to main direction of travel 42. Wheel 40 is thus positioned by spur 46 in a predefined oblique manner in response to a front impact.

These oblique positions of wheel 40 in a front impact are furthermore supported by a second spur 52 that is immovably disposed so as to be located somewhat below front wheel bearing 30 on wheel carrier 28, also obliquely at the front and pointing inward. This second spur 52 also includes an oblique deflection face 54 that functions analogously to deflection face 48. This deflection face 48 is created by bending spur 52 that is of especially slim form here, whereas deflection face 48 on first spur 46 is created as a rounding of spur 46 itself and its solid material.

REFERENCE LIST 10 vehicle
12 body
14 frame side member
16 projection
18 wheel housing
20 trailing arm
22 control arm
24 shock absorber
26 steering arm
28 wheel carrier
30 wheel bearing
32 brake disk
34 brake caliper
36 rim
38 tire
40 wheel
42 main direction of travel
44 object
46 first spur
48 deflection face
50 inside of the rim
52 second spur
54 deflection face

The invention claimed is:

1. A wheel carrier of a vehicle, comprising:
at least one spur configured and oriented on the wheel carrier to selectively deflect a wheel mountable on the wheel carrier in a predefined deflection direction in an event of an accident-generated application of force on the wheel.

2. The wheel carrier according to claim 1, wherein the at least one spur is directed inwardly proceeding from the wheel carrier relative to the vehicle and a main travel direction of the vehicle.

3. The wheel carrier according to claim 2, wherein the at least one spur has a deflection face oriented obliquely to the main travel direction proceeding from the wheel carrier relative to the vehicle and the main travel direction.

4. The wheel carrier according to claim 3, wherein the deflection face is aligned substantially parallel to a vertical axis of the vehicle.

5. The wheel carrier according to claim 1, wherein the at least one spur is disposed above a wheel bearing that supports the wheel on the wheel carrier relative to a vertical axis of the vehicle.

6. The wheel carrier according to claim 1, further comprising:
a second spur disposed below a wheel bearing supporting the wheel on the wheel carrier relative to a vertical axis of the vehicle.

7. The wheel carrier according to claim 5, further comprising:
a second spur disposed below the wheel bearing supporting the wheel on the wheel carrier relative to the vertical axis of the vehicle.

8. A vehicle, comprising:
a wheel carrier; and
at least one spur configured and oriented on the wheel carrier to selectively deflect a wheel mountable on the wheel carrier in a predefined deflection direction in an event of an accident-generated application of force on the wheel.

9. The vehicle according to claim 8, wherein the at least one spur is directed inwardly proceeding from the wheel carrier relative to the vehicle and a main travel direction of the vehicle.

10. The vehicle according to claim 9, wherein the at least one spur has a deflection face oriented obliquely to the main travel direction proceeding from the wheel carrier relative to the vehicle and the main travel direction.

11. The vehicle according to claim 10, wherein the deflection face is aligned substantially parallel to a vertical axis of the vehicle.

12. The vehicle according to claim 11, wherein the at least one spur is disposed above a wheel bearing that supports the wheel on the wheel carrier relative to a vertical axis of the vehicle.

13. The vehicle according to claim 12, further comprising:
a second spur disposed below the wheel bearing supporting the wheel on the wheel carrier relative to the vertical axis of the vehicle.

14. A method of deflecting a wheel mounted on a wheel carrier, the method comprising the acts of:
providing a wheel carrier having at least one spur oriented inwardly proceeding from the wheel carrier relative to the vehicle and a main travel direction of the vehicle;
in an event of an accident-generated application of force on the wheel, selectively deflecting the wheel in a predefined deflection direction based on the at least one inwardly oriented spur on the wheel carrier.

15. The wheel carrier according to claim 1, wherein the at least one spur is configured and oriented on the wheel carrier to at least partially be within a space defined by lateral sides of a wheel rim of the wheel that is selectively deflected in the predefined deflection direction in the event of the accident-generated application of force on the wheel.

16. The vehicle according to claim 8, wherein the at least one spur is configured and oriented on the wheel carrier to at least partially be within a space defined by lateral sides of a wheel rim of the wheel that is selectively deflected in the predefined deflection direction in the event of the accident-generated application of force on the wheel.

17. The method according to claim 14, wherein the act of providing the wheel carrier having the at least one spur further comprises the providing of the at least one spur to at least partially be within a space defined by lateral sides of a wheel rim of the wheel that is selectively deflected in the predefined deflection direction in the event of the accident-generated application of force on the wheel.

18. The wheel carrier according to claim 1, further comprising:
   at least one control arm projection extending from the wheel carrier, wherein
   the at least one spur is separate from any control arm projection.

19. The wheel carrier according to claim 1, wherein the at least one spur is configured and oriented to extend, in a main travel direction of the vehicle, beyond a brake disc mounted on the wheel carrier.

* * * * *